US009495828B2

(12) United States Patent
Loose et al.

(10) Patent No.: US 9,495,828 B2
(45) Date of Patent: Nov. 15, 2016

(54) GAMING MACHINE ENVIRONMENT HAVING CONTROLLED AUDIO MEDIA PRESENTATION

(75) Inventors: Timothy C. Loose, Chicago, IL (US); Eric M. Pryzby, Skokie, IL (US); Wayne H. Rothschild, Northbrook, IL (US); Larry J. Pacey, Prospect Heights, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 1256 days.

(21) Appl. No.: 12/077,681

(22) Filed: Mar. 20, 2008

(65) Prior Publication Data

US 2008/0176654 A1 Jul. 24, 2008

Related U.S. Application Data

(63) Continuation of application No. 10/342,720, filed on Jan. 16, 2003, now Pat. No. 7,364,508.

(51) Int. Cl.
*A63F 13/10* (2006.01)
*G07F 17/32* (2006.01)

(52) U.S. Cl.
CPC ........... *G07F 17/3227* (2013.01); *G07F 17/32* (2013.01)

(58) Field of Classification Search
USPC ............................................... 463/35, 20, 30
See application file for complete search history.

(56) References Cited

U.S. PATENT DOCUMENTS 3,533,629 A 10/1970 Raven ............................ 463/18
3,628,829 A 12/1971 Heilig .......................... 297/217
4,522,399 A 6/1985 Nishikawa ................ 273/143 R
4,679,143 A 7/1987 Hagiwara ..................... 364/411
4,837,728 A 6/1989 Barrie et al. .................. 364/412
5,133,017 A 7/1992 Cain et al. ....................... 381/71
5,143,055 A 9/1992 Eakin .............................. 128/33
5,259,613 A * 11/1993 Marnell, II ...................... 463/42

(Continued)

FOREIGN PATENT DOCUMENTS

AU 199943487 A1 3/2000 ............... A63F 9/22
EP 0 977 856 2/2000 ............ C12N 15/12

(Continued)

OTHER PUBLICATIONS

McGuire, Thomas, "Creative Sound Blaster Extigy review," dated Jul. 9, 2002, accessed Feb. 2, 2007, 8 pages, http://www.techspot.com/reviews/hardware/extigy/, 7 pages.

(Continued)

*Primary Examiner* — Tramar Harper
(74) *Attorney, Agent, or Firm* — Nixon Peabody LLP

(57) ABSTRACT

A method directed to operating a plurality of gaming machines in a gaming establishment includes determining that a certain triggering event has occurred in one of the plurality of gaming machines. The triggering event includes a desired game outcome. The method further includes selectively controlling audio output from a plurality of remotely located speakers to operate in conjunction with internal cabinet speakers for creating a desired audio ambience only within a portion of the gaming establishment. The remotely located speakers are located remotely from the plurality of gaming machines. The internal cabinet speakers are located within gaming cabinets of the plurality of gaming machines. The audio output is focused to deliver enhanced audio effects only to the portion of the gaming establishment.

26 Claims, 5 Drawing Sheets

(56) References Cited

U.S. PATENT DOCUMENTS

| | | | | |
|---|---|---|---|---|
| 5,318,298 | A | 6/1994 | Kelly et al. | 273/122 R |
| 5,370,399 | A | 12/1994 | Liverance | 273/434 |
| 5,411,258 | A | 5/1995 | Wilson et al. | 273/86 B |
| 5,444,786 | A | 8/1995 | Raviv | 381/71 |
| 5,469,510 | A | 11/1995 | Blind et al. | 381/55 |
| 5,524,888 | A | 6/1996 | Heidel | 43/21 |
| 5,533,727 | A | 7/1996 | DeMar | 463/23 |
| 5,542,669 | A | 8/1996 | Charron et al. | 463/13 |
| 5,547,192 | A | 8/1996 | Ishibashi | 463/26 |
| 5,580,309 | A | 12/1996 | Piechowiak et al. | 463/16 |
| 5,655,961 | A | 8/1997 | Acres et al. | 463/23 |
| 5,695,188 | A | 12/1997 | Ishibashi | 273/143 R |
| 5,743,798 | A | 4/1998 | Adams et al. | 463/17 |
| 5,762,552 | A | 6/1998 | Vuong et al. | 463/25 |
| 5,775,993 | A | 7/1998 | Fentz et al. | 463/17 |
| 5,807,177 | A | 9/1998 | Takemoto et al. | 463/47 |
| 5,812,674 | A | 9/1998 | Jot et al. | 381/17 |
| 5,816,918 | A | 10/1998 | Kelly et al. | 463/16 |
| 5,828,768 | A | 10/1998 | Eatwell et al. | 381/333 |
| 5,833,538 | A | 11/1998 | Weiss | 463/21 |
| 5,838,808 | A | 11/1998 | Prosser | 381/388 |
| 5,851,148 | A | 12/1998 | Brune et al. | 463/25 |
| 5,876,284 | A | 3/1999 | Acres et al. | 463/25 |
| 5,941,773 | A | 8/1999 | Harlick | 463/16 |
| 5,951,015 | A | 9/1999 | Smith et al. | 273/358 |
| 5,971,271 | A | 10/1999 | Wynn et al. | 235/380 |
| 5,971,850 | A | 10/1999 | Liverance | 463/23 |
| 6,056,640 | A | 5/2000 | Schaaij | 463/4 |
| 6,068,552 | A | 5/2000 | Walker et al. | 463/21 |
| 6,088,461 | A | 7/2000 | Lin et al. | 381/104 |
| 6,089,663 | A | 7/2000 | Hill | 297/258.1 |
| 6,110,041 | A | 8/2000 | Walker et al. | 463/20 |
| 6,146,273 | A | 11/2000 | Olsen | 463/27 |
| 6,162,121 | A | 12/2000 | Morro et al. | 463/16 |
| 6,217,448 | B1 | 4/2001 | Olsen | 463/25 |
| 6,239,810 | B1 | 5/2001 | Van Hook et al. | 345/431 |
| 6,254,483 | B1 | 7/2001 | Acres | 463/26 |
| 6,302,790 | B1 | 10/2001 | Brossard | 462/20 |
| 6,308,953 | B1 | 10/2001 | Nagano | 273/143 R |
| 6,315,666 | B1 | 11/2001 | Mastera et al. | 463/31 |
| 6,319,125 | B1 | 11/2001 | Acres | 463/25 |
| 6,354,943 | B1 * | 3/2002 | Miura | 463/29 |
| 6,368,216 | B1 | 4/2002 | Hedrick et al. | 463/20 |
| 6,416,411 | B1 | 7/2002 | Tsukahara | 463/35 |
| 6,422,941 | B1 | 7/2002 | Thorner et al. | 463/30 |
| 6,471,589 | B1 | 10/2002 | Nagano | 463/21 |
| 6,505,772 | B1 | 1/2003 | Mollett et al. | 235/379 |
| 6,508,709 | B1 | 1/2003 | Karmarkar | 463/42 |
| 6,530,842 | B1 | 3/2003 | Wells et al. | 463/46 |
| 6,537,152 | B2 | 3/2003 | Seelig et al. | 463/30 |
| 6,561,908 | B1 | 5/2003 | Hoke | 463/35 |
| 6,564,108 | B1 | 5/2003 | Makar et al. | 700/17 |
| 6,575,829 | B2 | 6/2003 | Coleman et al. | 463/20 |
| 6,638,169 | B2 | 10/2003 | Wilder et al. | 463/35 |
| 6,676,514 | B1 | 1/2004 | Kusuda et al. | 463/24 |
| 6,780,103 | B2 | 8/2004 | Bansemer et al. | 463/7 |
| 6,805,633 | B2 | 10/2004 | Hein, Jr. et al. | 463/35 |
| 6,840,860 | B1 | 1/2005 | Okuniewicz | 463/35 |
| 6,843,723 | B2 | 1/2005 | Joshi | 463/25 |
| 6,843,725 | B2 | 1/2005 | Nelson | 463/40 |
| 6,848,219 | B2 | 2/2005 | Standard et al. | 52/6 |
| 6,848,996 | B2 | 2/2005 | Hecht et al. | 463/35 |
| 6,866,581 | B2 | 3/2005 | Martinek et al. | 463/16 |
| 6,928,413 | B1 | 8/2005 | Pulitzer | 705/41 |
| 6,935,946 | B2 | 8/2005 | Yoseloff et al. | 463/16 |
| 6,935,955 | B1 | 8/2005 | Kaminkow et al. | 463/35 |
| 6,942,574 | B1 | 9/2005 | LeMay et al. | 463/41 |
| 6,968,063 | B2 | 11/2005 | Boyd | 381/57 |
| 2001/0004607 | A1 | 6/2001 | Olsen | 463/26 |
| 2001/0036857 | A1 * | 11/2001 | Mothwurf et al. | 463/25 |
| 2002/0037763 | A1 | 3/2002 | Idaka | 463/16 |
| 2002/0039919 | A1 | 4/2002 | Joshi et al. | 463/20 |
| 2002/0052230 | A1 | 5/2002 | Martinek et al. | 463/10 |
| 2002/0077170 | A1 | 6/2002 | Johnson et al. | 463/16 |
| 2002/0090990 | A1 | 7/2002 | Joshi et al. | 463/20 |
| 2002/0142825 | A1 | 10/2002 | Lark et al. | 463/16 |
| 2002/0142846 | A1 | 10/2002 | Paulsen | 463/43 |
| 2002/0151349 | A1 | 10/2002 | Joshi | 463/20 |
| 2002/0160826 | A1 | 10/2002 | Gomez et al. | 463/16 |
| 2003/0054881 | A1 | 3/2003 | Hedrick et al. | 463/29 |
| 2003/0064771 | A1 | 4/2003 | Morrow et al. | 463/16 |
| 2003/0073489 | A1 | 4/2003 | Hecht et al. | 463/35 |
| 2003/0073490 | A1 | 4/2003 | Hecht et al. | 463/35 |
| 2003/0073491 | A1 | 4/2003 | Hecht et al. | 463/35 |
| 2003/0100359 | A1 | 5/2003 | Loose et al. | 463/20 |
| 2003/0114214 | A1 | 6/2003 | Barahona et al. | 463/20 |
| 2003/0211881 | A1 | 11/2003 | Walker et al. | 463/20 |
| 2003/0220139 | A1 | 11/2003 | Peterson | 463/30 |
| 2004/0029637 | A1 | 2/2004 | Hein, Jr. et al. | 463/35 |
| 2004/0053695 | A1 | 3/2004 | Mattice et al. | 463/42 |
| 2004/0082388 | A1 | 4/2004 | Simsek et al. | 463/43 |
| 2004/0136553 | A1 | 7/2004 | Lee et al. | 381/307 |
| 2004/0138889 | A1 | 7/2004 | Gilboy et al. | 704/270 |
| 2004/0147316 | A1 | 7/2004 | Nagano | 463/35 |
| 2005/0277469 | A1 | 12/2005 | Pryzby et al. | 463/35 |
| 2006/0068909 | A1 | 3/2006 | Pryzby et al. | 463/35 |

FOREIGN PATENT DOCUMENTS

| | | | | |
|---|---|---|---|---|
| EP | 0 981 119 | A2 | 2/2000 | G07F 17/32 |
| JP | 3-297483 | A2 | 12/1991 | A63F 7/02 |
| JP | 5-31254 | | 2/1993 | A63F 9/22 |
| JP | 7-289730 | A2 | 11/1995 | A63F 7/02 |
| JP | 08-266724 | | 10/1996 | A63F 7/02 |
| JP | 9-299551 | A2 | 11/1997 | A63F 7/02 |
| JP | 10-277213 | | 10/1998 | A63F 7/02 |
| JP | 2001-728 | | 1/2001 | A63F 7/02 |
| JP | 2001000641 | A * | 1/2001 | A63F 7/02 |
| JP | 2002-177452 | | 6/2002 | A63F 5/04 |
| JP | 2002-263250 | | 9/2002 | A63F 5/04 |
| JP | 2002-272903 | | 9/2002 | A63F 5/04 |
| JP | 2003-919 | A2 | 1/2003 | A63F 7/02 |
| JP | 2003-88614 | A2 | 3/2003 | A63F 7/02 |
| JP | 2003-88615 | A2 | 3/2003 | A63F 7/02 |
| JP | 2003088615 | A * | 3/2003 | A63F 7/02 |
| JP | 2003-220271 | A2 | 8/2003 | A63F 7/02 |
| JP | 2003-250981 | A2 | 9/2003 | A63F 7/02 |
| JP | 2003-250982 | A2 | 9/2003 | A63F 7/02 |
| JP | 2003-310872 | A2 | 11/2003 | A63F 7/02 |
| WO | WO 00/17825 | A2 | 3/2000 | |
| WO | WO 01/05477 | A2 | 1/2001 | A63F 13/12 |
| WO | WO 01/05477 | A3 | 1/2001 | A63F 13/12 |
| WO | WO 01/33905 | A2 | 5/2001 | H04R 5/02 |
| WO | WO 01/33905 | A3 | 5/2001 | H04R 5/02 |
| WO | WO 02/24288 | A2 | 3/2002 | A63F 13/00 |
| WO | WO 02/24288 | A3 | 3/2002 | G07F 17/32 |
| WO | WO 02/40921 | A3 | 5/2002 | G06F 3/00 |

OTHER PUBLICATIONS

"WAV," Wikipedia: the Freee Encyclopedia, accessed Aug. 3, 2007, <http://en.wikipedia.org/wiki/WAV>, 4 pages.

Weinert, Joe, "Entertainment Vehicles," International Gaming & Wagering Business, IGWB New '97 Games, Mar. 1997, pp. 11-12, 15-18, 5 pages.

Wilson, Tracy V., "How Sound Cards Work," How Stuff Works, first accessed Jul. 25, 2007, http://computer.howstuffworks.com/sound-card.htm, 7 pages.

European Search Report corresponding to European Patent Application Serial No. EP 04 00 0865, European Patent Office, dated Oct. 6, 2004, 3 pages.

European Search Report corresponding to European Patent Application Serial No. EP 04 00 0730, European Patent Office, dated Oct. 11, 2004, 7 pages.

European Search Report corresponding to European Patent Application Serial No. EP 04 00 3314, European Patent Office, dated Oct. 13, 2004, 3 pages.

(56) References Cited

OTHER PUBLICATIONS

European Search Report corresponding to European Patent Application Serial No. EP 04 00 0731, European Patent Office, dated Oct. 14, 2004, 3 pages.

European Search Report corresponding to European Patent Application Serial No. EP 04 00 0729, European Patent Office, dated Aug. 3, 2004, 3 pages.

European Patent Office, Office Action in Application 04 000 731. 2-1238, Jul. 3, 2008.

* cited by examiner

GAMING MACHINE ENVIRONMENT HAVING CONTROLLED AUDIO MEDIA PRESENTATION

RELATED APPLICATIONS

This application is a continuation of U.S. patent application Ser. No. 10/342,720, filed on Jan. 16, 2003 now U.S. Pat. No. 7,364,508 concurrently with U.S. patent application Ser. No. 10/342,817 (titled "Audio Network For Gaming Machines"), U.S. patent application Ser. No. 10/342,809 (titled "Selectable Audio Preferences For A Gaming Machine"), and U.S. patent application Ser. No. 10/345,787 (titled "Gaming System With Surround Sound"), each of which is assigned to the assignee of the present application and each of which is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines and, more particularly, to a gaming machine and a gaming machine network having enhanced audio effects created by remotely located speakers.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Consequently, shrewd operators strive to employ the most entertaining and exciting machines available because such machines attract frequent play and, hence, increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is that of a "secondary" or "bonus" game which may be played in conjunction with a "basic" game. The bonus game may comprise any type of game, either similar to or completely different from the basic game. The bonus game is typically entered upon the occurrence of a selected event or outcome within the basic game. Such a bonus game produces a significantly higher level of player excitement than the basic game because it provides a greater expectation of winning than the basic game and is accompanied by more attractive or unusual video displays and/or audio.

Most types of enhancement, however, have focused primarily on visual effects. For example, gaming machines may included various types of displays for displaying different images in an "attract mode" to stir interest in players. And, the visual effects of the game features, such as reels and symbols, have been changed to be more attractive.

While these player-appeal features provide some enhanced excitement relative to other known games, there is a continuing need to develop new features for gaming machines to satisfy the demands of players and operators. Preferably, such new features will further enhance the level of player excitement. The present invention is directed to satisfying these needs.

SUMMARY OF THE INVENTION

In one aspect, a method directed to operating a plurality of gaming machines in a gaming establishment includes determining that a certain triggering event has occurred in one of the plurality of gaming machines. The triggering event includes a desired game outcome. The method further includes selectively controlling audio output from a plurality of remotely located speakers to operate in conjunction with internal cabinet speakers for creating a desired audio ambience only within a portion of the gaming establishment. The remotely located speakers are located remotely from the plurality of gaming machines. The internal cabinet speakers are located within gaming cabinets of the plurality of gaming machines. The audio output is focused to deliver enhanced audio effects only to the portion of the gaming establishment.

In another aspect of the invention, a gaming machine network includes a plurality of gaming machines, each of the plurality of gaming machines having a gaming cabinet and each gaming cabinet having one or more internal cabinet speakers. A plurality of remote speakers are positioned remotely from the plurality of gaming machines. An audio controller is electronically coupled to the plurality of remote speakers and is programmable to selectively control audio output from the plurality of remote speakers to create a desired audio ambience only within a specific portion of the gaming establishment by operating the plurality of remote speakers in conjunction with the internal cabinet speakers. The audio controller is further programmable to focus the audio output to deliver enhanced audio effects only to the specific portion of the gaming establishment.

In yet another aspect, a method is directed to operating a plurality of gaming machines residing in a gaming establishment. The method includes storing a plurality of triggering events in at least one memory device, and determining whether at least one triggering event has occurred in one or more of the gaming machines. In response to the at least one triggering event, a plurality of remote speakers are actuated. The remote speakers are positioned in the gaming establishment remotely from the plurality of gaming machines. The plurality of remote speakers are operated in conjunction with cabinet speakers that are located in gaming cabinets of the plurality of gaming machines. A desired audio ambience is created by focusing audio output from the plurality of remote speakers and the cabinet speakers only to a specific portion of the gaming establishment.

The above summary of the present invention is not intended to represent each embodiment, or every aspect, of the present invention. This is the purpose of the figures and the detailed description which follow.

BRIEF DESCRIPTION OF THE DRAWINGS

The foregoing and other advantages of the invention will become apparent upon reading the following detailed description and upon reference to the drawings.

Figure 1:
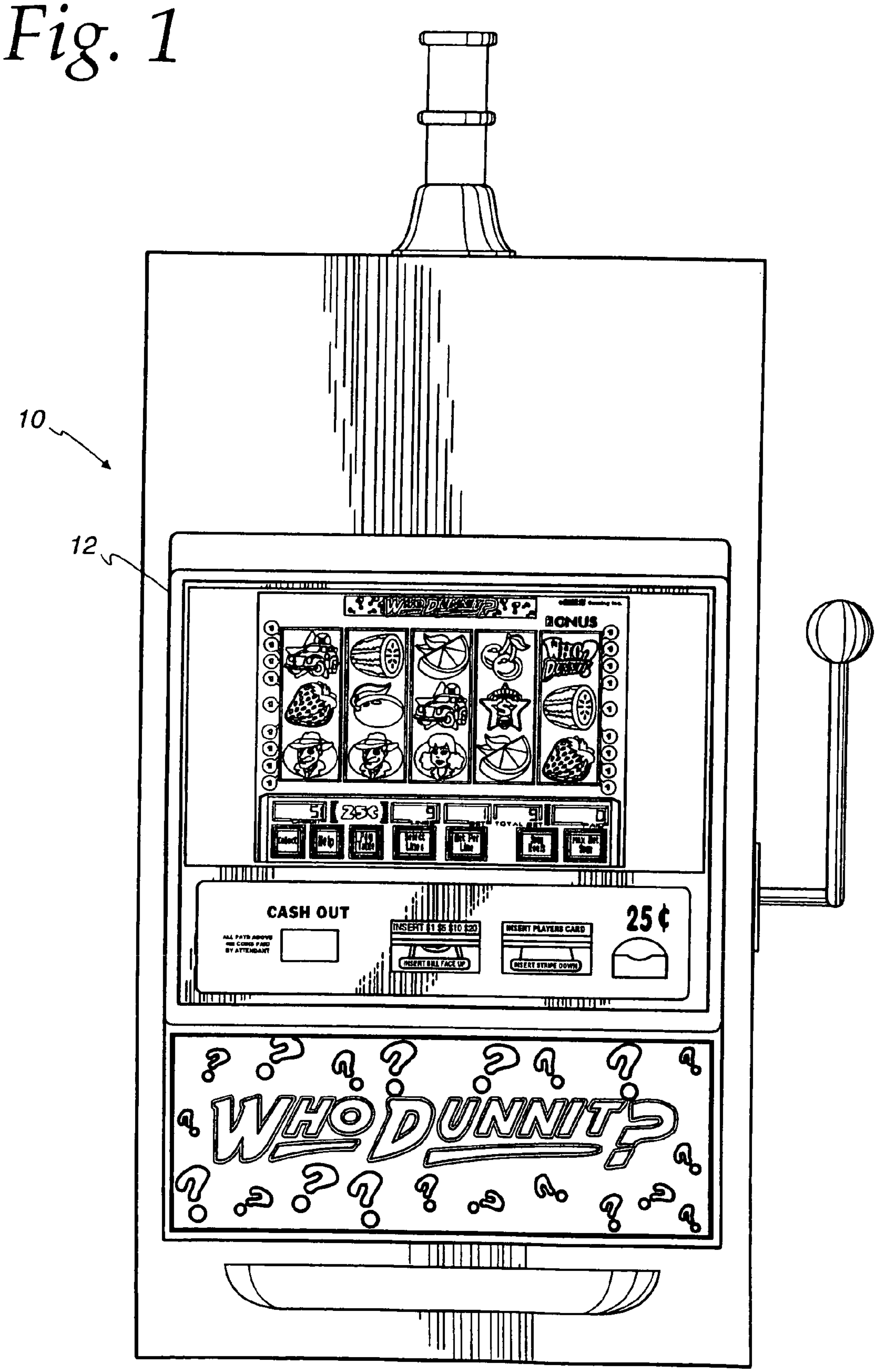
FIG. 1 is a simplified front view of a slot machine embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, a video gaming machine 10 is depicted that operates a basic wagering game, which may lead to a bonus game if certain outcomes are achieved in the basic game. The gaming machine 10 includes a game cabinet having a video display 12 that may comprise a dot matrix, CRT, LED, LCD, electro-luminescent display, or generally any type of video display known in the art. In the illustrated embodiment, the gaming machine 10 is an "upright" gaming terminal in which the video display 12 includes a touch screen and is oriented vertically relative to the player. It will be appreciated, however, that any of several other models of gaming machines are within the scope of the present invention, including, for example, a "slant-top" version in which the video display is slanted at about a 30° angle toward the player, or gaming machines that include mechanical, rather than video, displays.

In one embodiment, the gaming machine 10 is operable to play a game entitled WHO DUNNIT?™ having a mystery theme. The WHO DUNNIT?™ game features a basic game in the form of a slot machine with five simulated spinning reels and a bonus game, which may include strategy options that direct game activities on the video display 12. It will be appreciated, however, that the gaming machine 10 may be implemented with games other than the WHO DUNNIT?™ game and/or with several alternative game themes.

Figure 2:
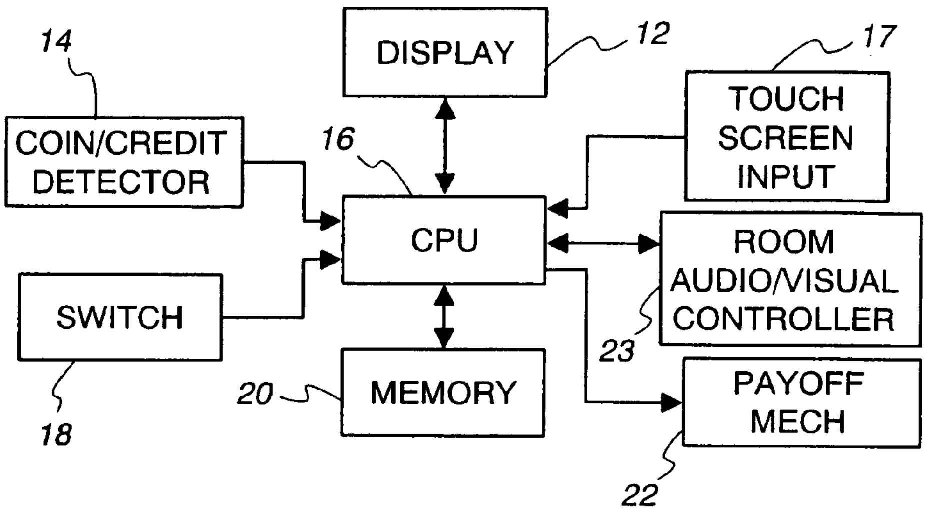
FIG. 2 is a block diagram of a control system suitable for operating the gaming machine in FIG. 1.

FIG. 2 is a block diagram of a control system suitable for operating the gaming machine 10. Coin/credit detector 14 signals a CPU 16 when a player has inserted a number of coins or played a number of credits. Then, the CPU 16 executes a game program which causes the video display 12 to display the basic game that includes simulated reels with symbols displayed thereon. The player may select a number of paylines to play, as is known in the art, and the wager amount may be entered via touch screen input keys 17 or other input devices on the game cabinet. The basic game commences in response to the player activating a switch 18, which is a lever or push button, causing the CPU 16 to set the reels in motion, randomly select a game outcome, and then stop the reels to display symbols corresponding to the pre-selected game outcome. In one embodiment, certain basic game outcomes cause the CPU 16 to enter a bonus mode, which causes the video display 12 to show a bonus game, as is known in the art.

A system memory 20 stores control software, operational instructions, and data associated with the gaming machine 10. In one embodiment, the system memory 20 comprises a separate read-only memory (ROM) and battery-backed random-access memory (RAM). It will be appreciated, however, that the system memory 20 may be implemented on any of several alternative types of memory structures or may be implemented on a single memory structure. A payoff mechanism 22 is operable in response to instructions from the CPU 16 to award a payoff of coins or credits to the player in response to certain winning outcomes, which may occur in the basic game or bonus game. The payoff amounts corresponding to certain combinations of symbols in the basic game are predetermined according to a pay table stored in system memory 20. The payoff amounts corresponding to certain outcomes of the bonus game are also stored in system memory 20.

As shown in FIG. 2, the CPU 16 for the gaming machine 10 is coupled to a gaming room audio/visual controller 23 (hereinafter "the A/V controller"). The A/V controller 23 is used for controlling the audio and visual effects in the gaming room in which the gaming machine 10 resides. As will be described below in more detail, the A/V controller 23 is coupled to a plurality of speakers and a plurality of projecting lights, and actuates those components in response to certain triggering events occurring in the gaming machine 10. The triggering events may be the entering of a bonus game, achieving a certain monetary win, a randomly selected time, or a randomly selected event such as a random number of pulls of a slot arm on a slot machine. The A/V controller 23 may be located internal to the gaming machine 10, may be part of a central gaming controller in the casino, or may be an application-specific controller that is linked and external to a plurality of game machines 10. This latter configuration is illustrated in FIG. 3.

In one basic system configuration, the gaming machine 10 stores data related to the audio and visual effects (hereinafter "A/V data") in the memory 20. The CPU 16, in response to a certain triggering event, then retrieves the A/V data from memory 20 and sends the A/V data to the A/V controller 23. The A/V controller 23 then actuates the speakers and projecting lights in accordance with the A/V data. Preferably, the audio data within the A/V data is in a digital format. As such, the A/V controller 23 must include components and circuitry for converting the digital audio data to analog audio signals, and amplifying those analog signals to produce an output from the speakers. In one preferred embodiment, the audio data is stored in a surround-sound format for broadcasting a surround-sound audio output from a plurality of speakers 23 spatially arranged around the gaming machine 10.

Figure 4:
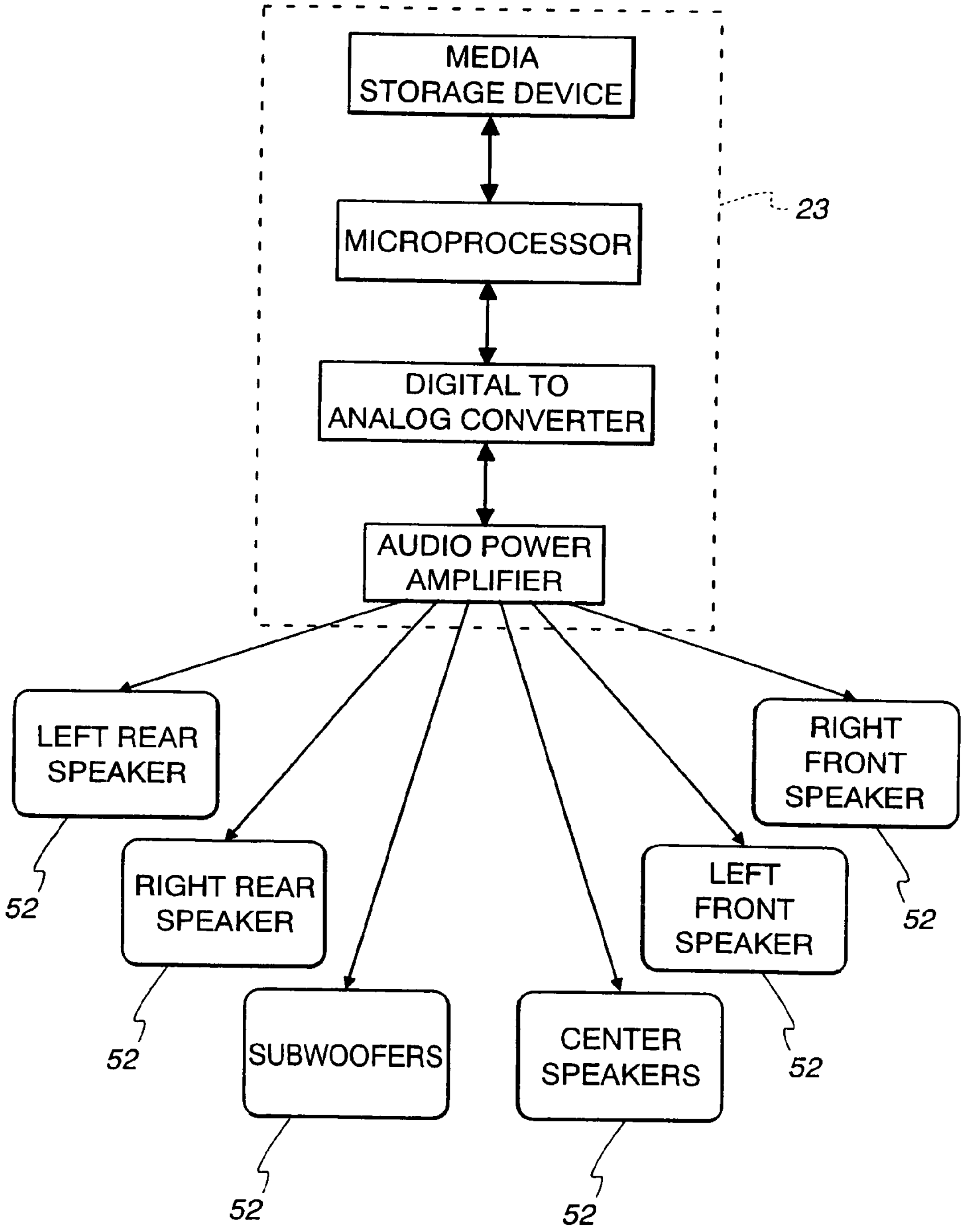
FIG. 4 illustrates a flow chart that schematically illustrates the processing of audio signals.

Rather than storing the A/V data in the gaming machines 10, other system configurations can be utilized as well so as to achieve enhanced audio and visual effects for a player of the gaming machine 10. For example, the A/V data can be stored within a memory device directly coupled to the A/V controller 23, as is shown in FIG. 4 in which the memory storage device is within the A/V controller 23. In such an embodiment, the memory device may only store A/V data. In this system configuration, the CPU 16 simply needs to transmit a signal to the A/V controller 23 indicating which triggering event has occurred, and the A/V controller 23 selects the corresponding A/V data for that triggering event. This system configuration allows for a more sophisticated audio and visual experience without overburdening the CPU 16 and the memory 20 of the gaming machine 10.

Figure 3:
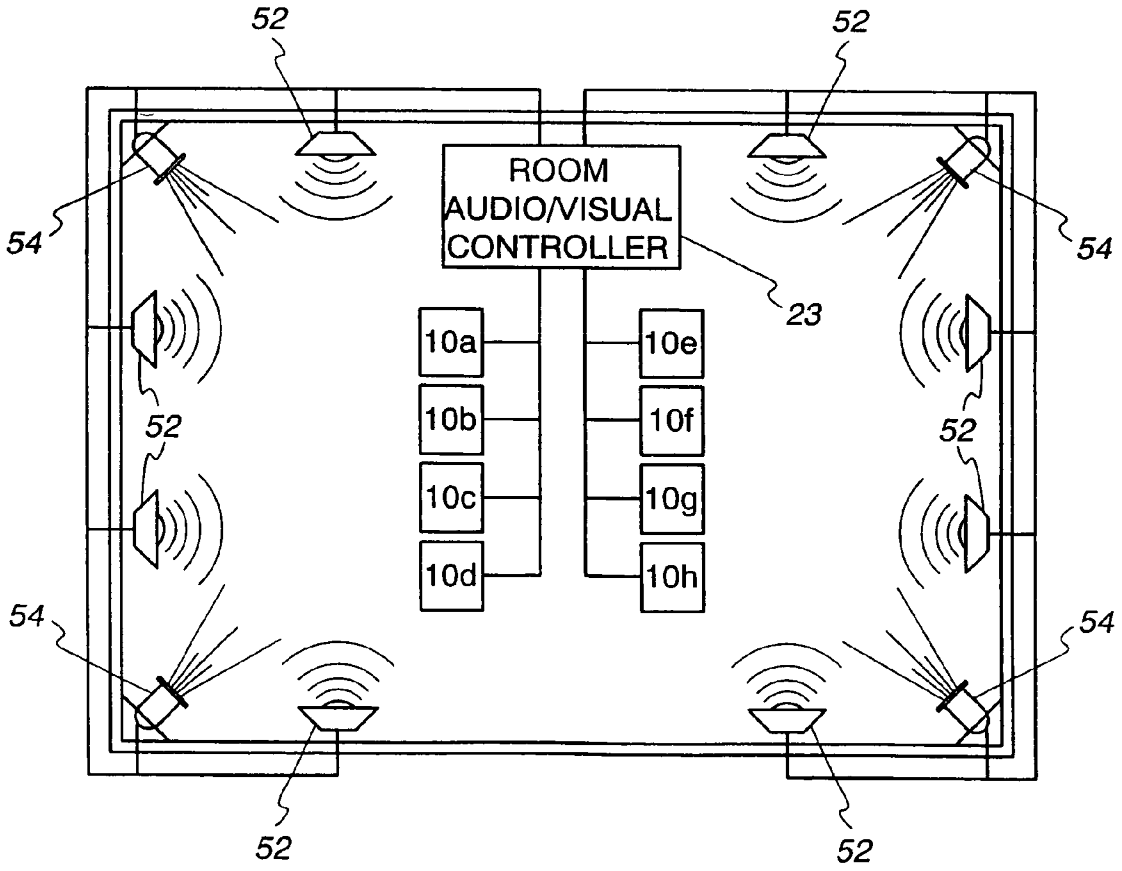
FIG. 3 illustrates a schematic of one embodiment of the present invention in which a bank of gaming machines resides in a gaming room providing enhanced audio and visual effects.

Referring now to FIG. 3, a gaming room 50 includes a plurality of gaming machines 10*a*-10*h*. The gaming machines 10*a*-10*h* may offer the same game, but may also present different games for players. Even if different games are present, the different games being played on the gaming machines 10*a*-10*h* may all have the same theme, such as a game-show theme or a sports theme.

The gaming room 50 includes a plurality of speakers 52 that are remotely placed around the gaming machines 10*a*-10*h*. Further, a plurality of projecting lights 54 are remotely located around the gaming machines 10*a*-10*h*. In this configuration, the gaming machines 10*a*-10*h* are coupled to the A/V controller 23, which is remotely located from the gaming machines 10*a*-10*h*. The A/V controller 23 is further coupled to the speakers 52 and the projecting lights 54. Based on the triggering signals received from the gaming machines 10*a*-10*h*, the A/V controller 23 selectively controls the audio output from the speakers 52 and the light patterns from the projecting lights 54. Preferably, the speakers 52 and projecting lights 54 are arranged so that regardless of which gaming machine achieves a certain triggering event, the player of that gaming machine experiences audio outputs and lighting patterns that are substantially similar to audio outputs and lighting patterns that would be experienced if the player encountered the same triggering event at a different gaming machine.

It should be noted that the present invention contemplates a gaming machine system having a multitude of differing audio and visual effects, each being dictated by a certain triggering event. Further, in some situations, only certain speakers 52 and projecting lights 54 are actuated such that the audio and visual effects may be directed to only gaming machines 10*a*-10*d*, while players at the gaming machines 10*e*-10*h* do not experience the full audio and visual ambience.

The speakers 52 broadcast audio output to the players of the gaming machines 10*a*-10*h*, as well as spectators adjacent to the gaming machine 10. The audio output may include various outputs, such as messages related to the gaming machines 10*a*-10*h* being played (e.g., informational or instructional content), messages unrelated to the gaming machines 10*a*-10*h*, a certain type of music (e.g., rock, classical, jazz, etc.), or music related to a theme of a game being played on one or more of the gaming machines 10*a*-10*h*. Preferably, the relative orientation of the speakers 52 and the gaming machines 10*a*-10*h* allows the speakers 52 to deliver surround sound to the players of the gaming machines 10*a*-10*h*. Also, if different gaming machines 10*a*-10*h* with different themes are grouped together, then the speakers 52 preferably are capable of delivering audio outputs corresponding to the different themes.

Also, the speakers 52 may work in conjunction with the typical speakers that are mounted with the gaming machines 10*a*-10*h* to deliver enhanced effects. For example, while playing a gaming machine with a game-show theme, the gaming machine speakers may instruct the player, "OK, you now need to choose a prize from behind door number 1, door number 2, or door number 3." After making the selection and achieving a positive result, the remote speakers 52 can deliver an audio output that makes the player feel as though he or she is in a virtual studio audience where the audience is clapping. The projecting light 54 may also focus a light pattern on the player at this point as well. Then, the gaming machine speakers may instruct the player, "The audience really loved that choice!"

In one preferred embodiment, the speakers 52 deliver focused audio output to only certain regions of the gaming room 50 (audio 3D). Accordingly, in addition to the projecting lights 54 being able to focus the light pattern on one gaming machine, the speakers 52 can focus the audio output on one gaming machine as well.

The projecting lights 54 are preferably luminaries, which are complete lighting units capable of delivering focused light to a certain area, as is commonly used in concerts and theatres. Luminaries have their own internal control mechanisms for various photometrics, such as colors, beam divergence, intensity, strobing, etc. Preferably, the luminaries used in the gaming room 50 have motors for changing the position of the beam (e.g., from the first gaming machine 10*a* in a bank, to the last gaming machine 10*d* in the bank) and the beam divergence (e.g., beams where the angle of divergence changes over a short period of time). As such, luminaries provide for dynamic control of the beams in the gaming room 50. Example of luminaries useful for the gaming room 50 are manufactured and sold by Vari-Lite Inc. of Dallas, Tex.

Alternatively, the projecting lights 54 may also be fixed lights providing focused beams to only certain parts of the gaming room 50. As an example, each gaming machine 10*a*-10*h* may have a set of fixed lights that are remotely located therefrom, and capable of delivering light to only that gaming machine 10*a*-10*h*.

FIG. 4 illustrates one method of the processing of audio signals within the audio and visual effects system of the present invention. Here, the A/V controller 23 includes a media storage device to store the A/V data, which includes digital audio data. A microcontroller or microprocessor within the A/V controller 23 receives the digital audio data and sends it to a D/A converter. The analog signals leaving the D/A converter are amplified and the amplified analog signals are then sent to the various speakers 52 throughout the gaming room. If the gaming room 50 (FIG. 3) only requires a certain audio output in one region, the audio data may have some location data to ensure that the audio output is broadcast in the desired region, likely by actuating only certain ones of the speakers 52.

FIG. 4 illustrates a set of speakers 52 that can provide a surround-sound audio experience. The speakers 52 include rear left speakers, rear right speakers, front left speakers, front right speakers, center speakers, and subwoofers. The various formats for the audio data sets that can be used by the embodiments of the present invention for delivering surround sound are described in detail in U.S. patent application Ser. No. 10/345,787 entitled "Gaming System With Surround Sound" (which was filed on the same day as the parent application, having common inventors as the present application, and being owned by the assignee of the present application), which has been incorporated by reference in its entirety.

In a similar fashion to FIG. 4, the control of the projecting lights 54 is dictated by the A/V data stored in the media storage device of the A/V controller 23. The type of visual control data that is to be transmitted from the microprocessor to the projecting lights 54 depends on the type of projecting lights 54. If the projecting lights 54 have motors to steer their beams, the visual control data needs to have some location data to ensure the light patterns are created at the appropriate location in the gaming room 50. Preferably, the data is digital and is sent in a digital format to the projecting lights 54, which is then processed by local controllers in the projecting lights 54 for developing the selected light pattern. As such, the D/A converter and amplifier in FIG. 4 may not be needed for the visual control data sent to the projecting lights 54.

In short, in the preferred embodiment, the media storage device in the A/V controller 23 stores the various light patterns that can be selected and sends "high-level" instructions to the projecting lights 54 corresponding to the selected light pattern. The local controllers at the projecting lights 54 then converts the "high-level" instructions to "low-level" instructions, which are internally used by the projecting lights 54 to control internal components such as lenses, motors, power supplies, etc., to result in the desired light pattern corresponding to the triggering event. As an example, "high-level" instructions may be to focus a red beam on gaming machine 10*a*. The corresponding "low-level" instructions would be for the motor to adjust the location of the beam to coordinates x, y, z, (where gaming machine 10*a* is located) and for switching the color filter to one that will result in a red light. To achieve this type of control, the A/V controller 23 may employ lighting control hardware and software for communicating with the projecting lights 54. This lighting control hardware and software is commonly available from manufacturers of luminaries, such as Vari-Lite, Inc. of Dallas, Tex.

It should be noted that the present invention contemplates that the AN controller 23 may comprise two distinct controllers, one for controlling the audio output and one for controlling the light patterns. The two distinct controllers may be remotely located from each other. Each would receive signals identifying the occurrence of certain triggering events.

Figure 5:
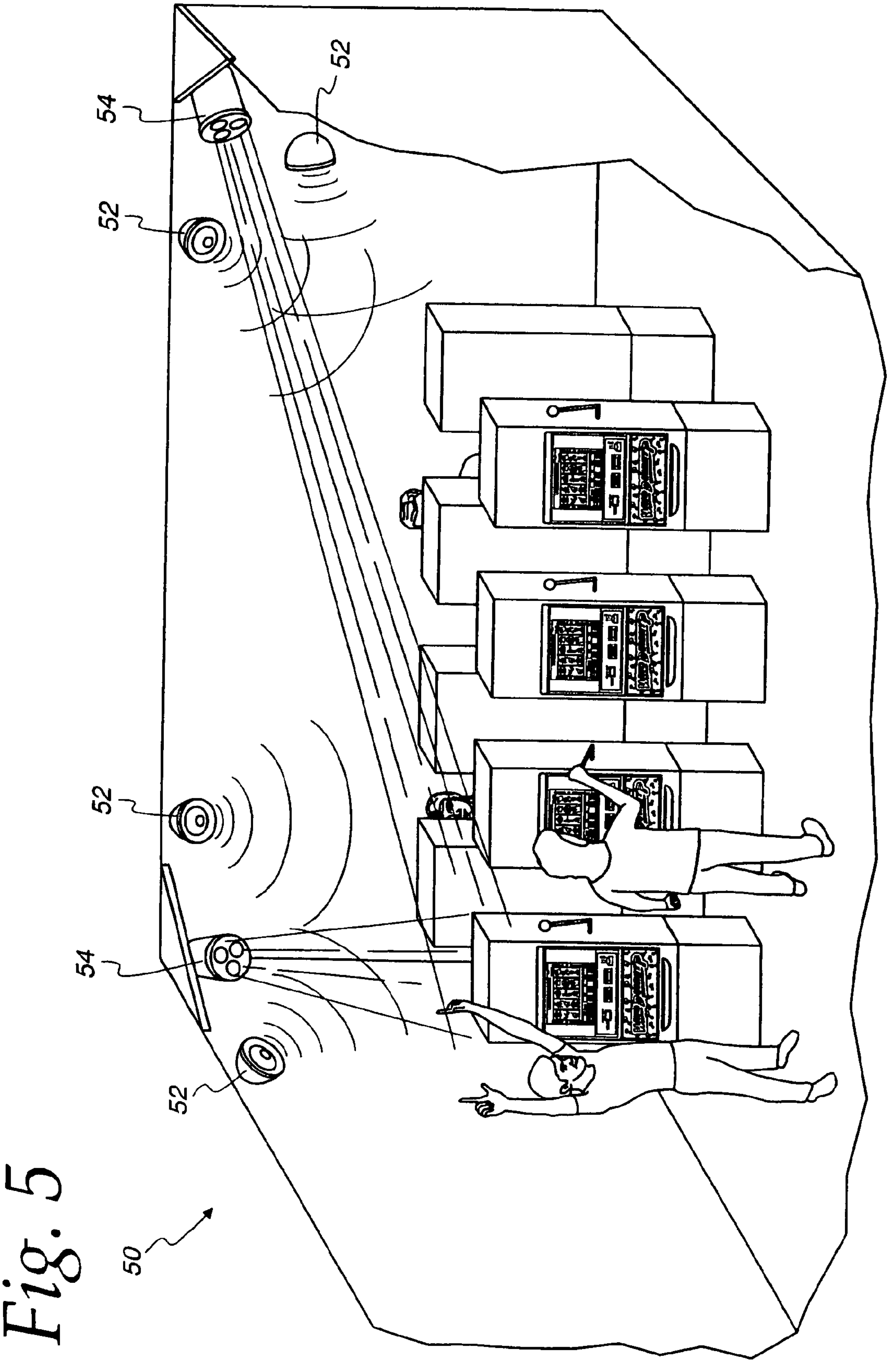
FIG. 5 illustrates a gaming room according to one embodiment of the present invention in which one gaming machine has achieved a certain outcome, causing enhanced audio and visual effects to be presented to the gaming room.

FIG. 5 illustrates one type of result that can be achieved by the audio and visual effects system in a gaming room 50 having remotely located speakers and remotely located projecting lights 54 in accordance to the present invention. In this embodiment, the triggering event for the enhanced visual and audio ambience is achieving a certain game outcome at one of the gaming machines 10. In response to this triggering event, the AN controller 23 (not shown in FIG. 5) receives a signal from the gaming machine 10 that indicates that it has achieved this certain game outcome (e.g., the entry into a bonus game mode). The AN controller 23 would then cause the actuation of the projecting lights 54 and speakers 52 to result in a certain audio output and light pattern. As shown, some of the projecting lights 54 in the gaming room have focused their beams on the wining gaming machine. Alternatively, knowing the location where the player would stand or sit relative to the gaming machine 10, the projecting lights 54 may focus their beams at that location where the player would normally be standing or sitting.

There is a wide variety of audio output that can be broadcast from the speakers 52. If the gaming machine has a game-show theme, the audio output may simply be sounds simulating an excited studio audience from a game-show. When coupled with the focused light patterns, the player may feel that he or she is totally emersed in a game-show environment. Or, the audio output may be music that is indicative of the game outcome, such as the song "We Are The Champions" by the musical group Queen. Still further, music lacking lyrics, but which is fast and upbeat, could be broadcast from the speakers 52 to indicate a positive game outcome. The focused audio output defines, in essence, a sound stage for the player of the gaming machine.

In short, the enhanced visual and audio ambience in the gaming room 50 of the present invention further enhances the level of player excitement. Players not typically desiring to play these types of games are much more likely to be intrigued by the gaming machine, resulting in a larger market of players for gaming machines providing these enhanced audio and visual effects. Further, because some players may not enjoy being the focal point of attention, the gaming machines may have inputs that allow the players to avoid the enhanced audio and visual experience after he or she achieves a certain outcome.

Figure 6:
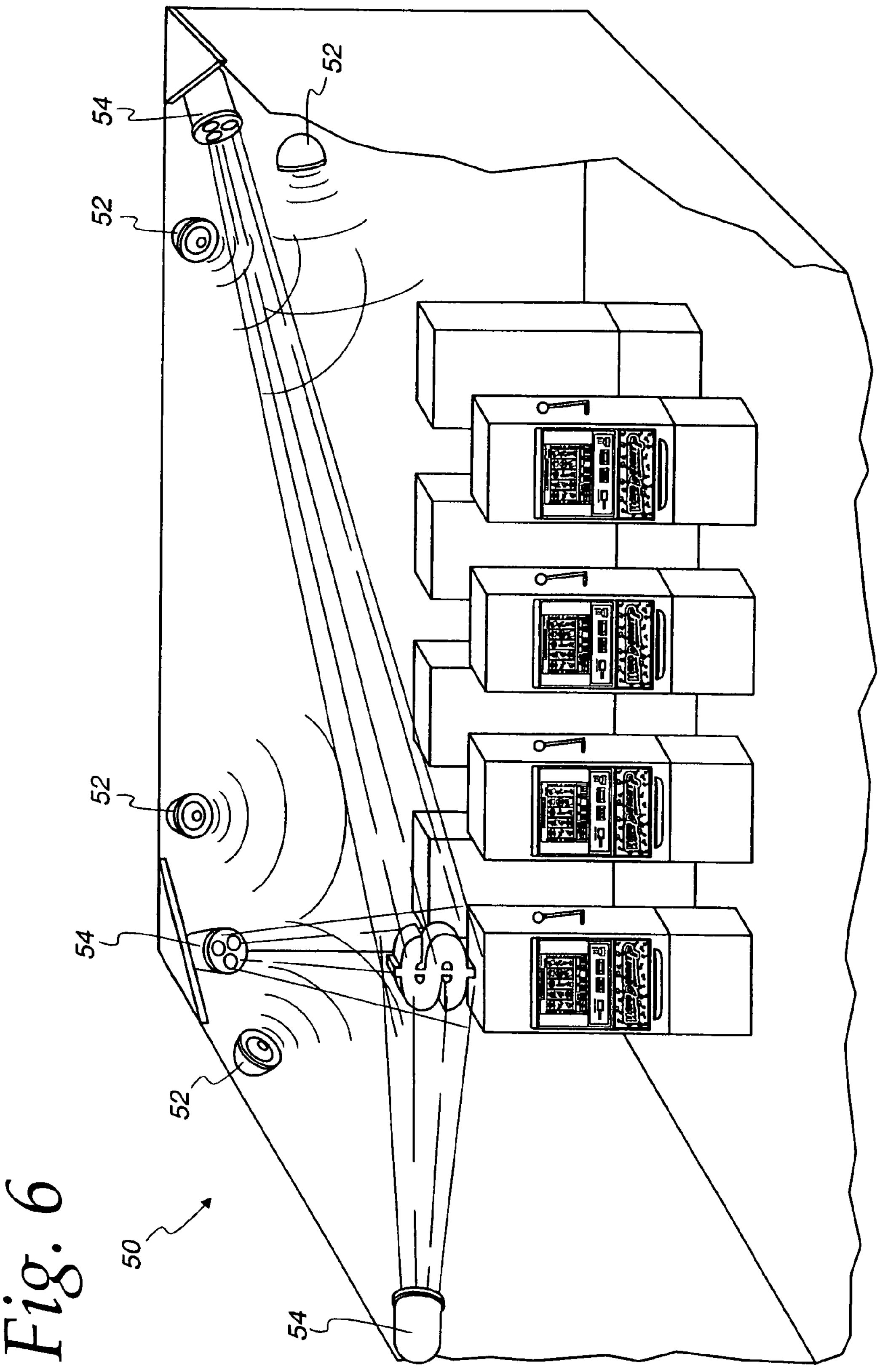
FIG. 6 illustrates a gaming room according to another embodiment of the present invention where an attract mode with enhanced audio and visual effects are presented to the gaming room.

FIG. 6 is similar to FIG. 5 as it illustrates the gaming room 50 with the speakers 52 and the projecting lights 54. However, the triggering event is inactivity of one or more gaming machines over a certain period of time, causing the system to operate in an "attract mode" to stir interest from players in the vicinity of the gaming machines. As such, one or more of the gaming machines sends a signal indicating inactivity after a predefined period of time. In the attract mode, the light pattern could be the focusing of beams on an inactive machine, and it may be accompanied by an audio output that may state "This machine wants to give away money!! Who wants the money?"

Alternatively, and as shown in FIG. 6, the gaming room 50 may have objects positioned above the gaming machines that allow for the display of images above the gaming machines. As an example, the object can be relatively transparent so that it is generally unnoticed by the players of the gaming machines. Such an object may be a thin layer of plastic or other target material capable of displaying an image. Instead, of simply directing light beams, the projecting lights 54 project focused images that are displayed on the object above the gaming machine. As shown in FIG. 6, the recognizable image is a dollar sign.

Alternatively, the projecting lights 54 may be of a type that provides a floating, volume-filling image that has substantial 3-dimensional qualities (e.g., an autostereoscopic image). For example, such an image may be of a gaming machine that has a highly desirable game outcome on its display, perhaps leading players to believe that the actual gaming machine below this 3D image may soon yield such an outcome. To produce such images, more sophisticated projecting lights 54 are needed, as well as a rotating display for the image. Such systems are available from Actuality Systems, Inc. of Burlington, Mass.

While the present invention has been described with reference to one or more particular embodiments, those skilled in the art will recognize that many changes may be made thereto without departing from the spirit and scope of the present invention. As one example, the gaming machine network may provide only enhanced audio output from the remotely located speakers. Or, the gaming machine network may provide only enhanced visual output from the remotely located projecting lights. Further, the present invention is also useful for wagering games where the CPU 16 (FIG. 2) and/or memory 20 (FIG. 2) are located remotely from a gaming terminal with the input/output devices that receive wagering inputs and other instructions from the player and display the randomly selected outcome to the player. Each of these embodiments and obvious variations thereof is contemplated as falling within the spirit and scope of the claimed invention, which is set forth in the following claims.

What is claimed is:

1. A method of operating a gaming system in a gaming establishment, the gaming system including an external audio controller, a plurality of gaming machines, and a plurality of remote speakers, the plurality of gaming machines including respective gaming cabinets and internal cabinet speakers housed therein, the plurality of remote speakers being remote from the plurality of gaming machines, the external audio controller being external to the plurality of gaming machines, the external audio controller being communicatively coupled to both the plurality of remote speakers and the internal cabinet speakers such that the plurality of remote speakers and the internal cabinet speakers are capable of outputting audio under control of the external audio controller, the method comprising:

in response to a certain triggering game event in a wagering game played via one of the plurality of gaming machines, receiving at the external audio controller a triggering signal associated with the triggering game event;

using the external audio controller to select audio data associated with the triggering signal; and selectively controlling the plurality of remote speakers and the internal speakers to output audio based on the audio data and concurrently focused on less than all of the plurality of gaming machines.

2. The method of claim 1, wherein the audio includes a message for a player of the one of the plurality of gaming machines.

3. The method of claim 1, wherein the triggering game event is a randomly selected positive game outcome, and wherein the audio is indicative of the positive game outcome.

4. The method of claim 1, wherein the selectively controlling includes controlling the plurality of remote speakers and the internal speakers to output audio based on the audio data and focused on the one of the plurality of gaming machines or the player at that machine.

5. The method of claim 1, wherein the audio data is in a surround sound format, and wherein the plurality of remote speakers are spatially arranged relative to the plurality of gaming machines and work in conjunction with the internal cabinet speakers to provide the audio in surround sound to one or more players at less than all of the plurality of gaming machines.

6. The method of claim 1, further including storing the audio data in a memory coupled to or within the external audio controller.

7. The method of claim 6, wherein the storing includes storing a plurality of triggering game events and corresponding audio data associated with each of the triggering game events.

8. The method of claim 1, wherein the audio relates to a theme of the one of the plurality of gaming machines.

9. A method of operating a gaming system in a gaming establishment, the gaming system including an external audio controller, a plurality of gaming machines, and a plurality of remote speakers, the plurality of gaming machines including respective gaming cabinets and internal cabinet speakers housed therein, the plurality of remote speakers being remote from the plurality of gaming machines, the external audio controller being external to the plurality of gaming machines, the external audio controller being communicatively coupled to both the plurality of remote speakers and the internal cabinet speakers such that the plurality of remote speakers and the internal cabinet speakers are capable of outputting audio under control of the external audio controller, the method comprising:

determining that a certain triggering event has occurred in a wagering game played via one of the plurality of gaming machines, the triggering event including a desired game outcome; and in response to the triggering event, creating a desired audio ambience for less than all of the plurality of gaming machines by using the external audio controller to selectively control the plurality of remote speakers and the internal cabinet speakers, actuate only certain remote speakers of the plurality of remote speakers, operate the certain remote speakers concurrently and in conjunction with internal cabinet speakers of less than all of the plurality of gaming machines, and deliver enhanced audio effects to the less than all of the plurality of gaming machines.

10. The method of claim 9, wherein the audio includes a message for a player of the one of the plurality of gaming machines.

11. The method of claim 9, wherein the triggering game event is a randomly selected positive game outcome, and wherein the audio is indicative of the positive game outcome.

12. The method of claim 9, wherein the less than all of the plurality of gaming machines includes the one of the plurality of gaming machines in which the certain triggering event has occurred.

13. The method of claim 9, wherein the enhanced audio effects are in a surround sound format, the plurality of remote speakers being spatially arranged relative to the plurality of gaming machines to provide the enhanced audio effect in surround sound to one or more players at the less than all of the plurality of gaming machines.

14. The method of claim 9, further including storing the enhanced audio effects in a memory coupled to or within the external audio controller.

15. The method of claim 14, wherein the storing includes storing a plurality of triggering events and corresponding audio data associated with each of the triggering events.

16. The method of claim 9, wherein the audio relates to a theme of the one of the plurality of gaming machines.

17. A gaming system for conducting wagering games in a gaming establishment, comprising:

a plurality of gaming machines including respective gaming cabinets and internal cabinet speakers housed therein;

a plurality of remote speakers positioned remote from the plurality of gaming machines;

an external audio controller positioned externally to the plurality of gaming machines, the external audio controller being communicatively coupled to both the plurality of remote speakers and the internal cabinet speakers such that the plurality of remote speakers and the internal cabinet speakers are capable of outputting audio under control of the external audio controller, the external audio controller being programmable to in response to a certain triggering game event in a wagering game played via one of the plurality of gaming machines, receive a triggering signal associated with the triggering game event;

select audio data associated with the triggering signal, and selectively control the plurality of remote speakers and the internal speakers to output audio based on the audio data and concurrently focused on less than all of the plurality of gaming machines.

18. The gaming system of claim 17, wherein the audio includes a message for a player of the one of the plurality of gaming machines.

19. The gaming system of claim 17, wherein the triggering game event is a randomly selected positive game outcome, and wherein the audio is indicative of the positive game outcome.

20. The gaming system of claim 17, wherein the external audio controller is further programmable to control the plurality of remote speakers and the internal speakers to output audio based on the audio data and to focus the audio on the one of the plurality of gaming machines or the player at that machine.

21. The gaming system of claim 17, wherein the audio data is in a surround sound format, and wherein the plurality of remote speakers are spatially arranged relative to the plurality of gaming machines and work in conjunction with the internal cabinet speakers to provide the audio in surround sound to one or more players at the less than all of the plurality of gaming machines.

22. The gaming system of claim 21, further comprising a memory coupled to or within the external audio controller, the audio data being stored in the memory.

23. The gaming system of claim 22, wherein the memory further includes a plurality of stored triggering game events and corresponding audio data associated with each of the triggering game events.

24. The gaming system of claim 17, wherein the audio relates to a theme of the one of the plurality of gaming machines.

25. The gaming system of claim 17, wherein the triggering game event is inactivity in one or more of the plurality of gaming machines over a certain period of time.

26. The gaming system of claim 17, wherein only certain ones of the remote speakers are actuated to focus the audio to the less than all of the plurality of gaming machines.

* * * * *